United States Patent

Mizutani

[11] Patent Number: 5,910,941
[45] Date of Patent: Jun. 8, 1999

[54] DISC CARTRIDGE LID STRUCTURE

[75] Inventor: Hikaru Mizutani, Mino, Japan

[73] Assignee: Hitachi Maxell, Ltd., Osaka-fu, Japan

[21] Appl. No.: 08/806,321

[22] Filed: Feb. 26, 1997

[30] Foreign Application Priority Data

Feb. 26, 1996 [JP] Japan .................................. 8-065492

[51] Int. Cl.$^6$ ............................. G11B 23/02; G11B 23/03
[52] U.S. Cl. ........................ 369/291; 360/133; 206/308.1
[58] Field of Search ........................... 369/291; 360/133; 206/308.1, 308.2

[56] References Cited

U.S. PATENT DOCUMENTS

| 4,455,642 | 6/1984 | Inaba | 369/291 |
| 5,093,823 | 3/1992 | Ouwerkerk et al. | 369/291 |
| 5,150,354 | 9/1992 | Iwata et al. | 369/291 |
| 5,293,293 | 3/1994 | Iwata et al. | 360/133 |
| 5,615,070 | 3/1997 | Bordes | 360/133 |

FOREIGN PATENT DOCUMENTS

| 0421775 A2 | 4/1991 | European Pat. Off. . |
| 0617425 A2 | 9/1994 | European Pat. Off. . |
| 0692788 A2 | 1/1996 | European Pat. Off. . |
| 2272990 | 6/1994 | United Kingdom . |

*Primary Examiner*—William J. Klimowicz
*Attorney, Agent, or Firm*—Birch, Stewart, Kolasch & Birch, LLP

[57] ABSTRACT

A disc cartridge includes a cartridge casing for freely rotatably accommodating a disc-shaped recording medium. The cartridge casing has positioning recesses defined in respective portions of the right and left sides of the cartridge casing adjacent the rear end thereof. A generally U-shaped access opening is defined in the rear end of the cartridge casing and respective portions of the left and right sides thereof including the associated recesses. A lid assembly for selectively opening and closing the access opening is pivotally supported by the cartridge casing. The lid assembly includes a lid body adapted to protrude into the cartridge casing so as to occupy a space between the recording medium within the cartridge casing and the access opening. The lid body includes a regulating surface for restricting a play of the recording medium within the cartridge casing and left and right cutouts defined therein in a manner alignable with the left and right recesses, respectively. A thin-walled cavity for reducing the volume and weight of the lid assembly being formed so as to occupy a major portion of surface walls of the lid body while opening at at least one of upper and lower surface walls.

6 Claims, 5 Drawing Sheets

DISC CARTRIDGE LID STRUCTURE

BACKGROUND OF THE INVENTION

1. Field of the Invention

The present invention generally relates to a disc cartridge of a generally rectangular configuration for removably accommodating a disc-shaped optical or magnetooptical recording medium and, more particularly, to a lid structure for the disc cartridge for selectively opening and closing the access opening leading into the interior of the disc cartridge for removal or replacement of the optical recording medium.

2. Description of the Prior Art

The disc cartridge of the type referred to above is disclosed in, for example, the Japanese Laid-open Patent Publication No. 5-243626, published in 1994. According to this publication, the disc cartridge comprises a generally rectangular flattened casing having an access opening defined at a rear end thereof so as to extend over the entire width thereof. This known disc cartridge also includes a lid for selectively opening and closing the access opening to allow the disc-shaped recording medium, for example, the optical disc, to be removed from and inserted into the interior of the casing, respectively. The lid has a flange that can be received within the access opening in the casing when it is held in position to close the access opening. This lid is pivoted at one end to one corner region at the rear end of the casing so that it can be swung about 180° to open the access opening.

In this known disc cartridge, problems would arise when detent recesses that may be utilized for positioning the disc cartridge or for removal of one disc cartridge from a library are to be defined in the disc cartridge at respective locations lying on the path of movement of the optical disc out from or into the casing. As is well known to those skilled in the art, the cartridge casing has a width slightly greater than the outer diameter of the optical disc and, therefore, if the detent recesses are formed in opposite side walls of the cartridge casing, the detent recesses would leave an internal space therebetween which is narrower than the outer diameter of the optical disc. Accordingly, where the detent recesses are to be formed, the cartridge casing must have an increased width in order for the optical disc to be smoothly removed from or inserted into the cartridge casing. Thus, formation of the detent recesses in the cartridge casing inevitably results in increase in size of the disc cartridge.

The increase in size of the disc cartridge may be avoided if a wall element defining each detent recess in the respective side wall of the cartridge casing is formed with a slit that is so sized and so shaped as to allow opposite outer peripheral portions of the optical disc to pass through the associated slits during removal or insertion of the optical disc from or into the cartridge casing. The use of the slits in the wall elements defining the respective detent recesses in turn necessitates the lid to be so shaped and so configured as to have, in addition to the capability of selectively opening and closing the access opening, an extra capability of selectively opening and closing the slits to thereby avoid any possible ingress of foreign matter into the cartridge casing. Specifically, a space between the optical disc and the access opening is necessarily occupied by the lid having a thickness generally equal to the space between top and bottom panels forming the cartridge casing. The lid having such an increased wall thickness is susceptible to deformation during molding thereof and, for example, the accuracy with which a partially arcuate regulating surface used to restrict an arbitrary motion or play of the optical disc within the cartridge casing is formed tends to be lowered. In addition, an increased amount of synthetic resin is needed to form the lid, accompanied by increase in manufacturing cost and weight.

Moreover, so long as the single lid is used to selectively open and close the access opening, no optical disc can be smoothly removed from or inserted into the disc cartridge unless the lid is fully swung 180° or more to thereby clear the path of movement of the optical disc from or into the disc cartridge. This means that the prior art disc cartridge requires the lid to have an increased stroke of pivotal movement between opened and closed positions. This means that removal or insertion of the optical disc from or into the disc cartridge in a limited available space would not be accomplished with no difficulty. In addition, the necessity of the lid to pivot relative to the cartridge casing requires a gap present between a pivot front end of the flange and a cutout opening, and foreign matter can easily find a way into the disc cartridge through such gap.

SUMMARY OF THE INVENTION

The present invention has accordingly an essential object to provide an improved disc cartridge of a type halving positioning recesses defined in the vicinity of the access opening, which is compact in size and effective to allow the optical disc to be easily and smoothly removed from or inserted into the cartridge casing and which is dust-tight when the lid is in position to close the access opening.

Another important object of the present invention is to provide an improved disc cartridge of the type referred to above, wherein both the volume and the weight of the lid are reduced to allow the lid to be manufactured accurately and at reduced cost.

A further important object of the present invention is to provide an improved disc cartridge of the type referred to above, wherein the lid has a minimized stroke of pivotal movement between opened and closed position to allow the optical disc to be conveniently removed from or inserted into the disc casing.

To this end, the disc cartridge according to the present invention comprises a cartridge casing for freely a rotatably accommodating a disc-shaped recording medium, which is provided with positioning recesses defined in respective portions of the right and left sides of the cartridge casing adjacent the rear end thereof. A generally U-shaped access opening is defined in the rear end of the cartridge casing and respective portions of the left and right sides thereof including the associated recesses. A lid assembly for selectively opening and closing the access opening is pivotally supported by the cartridge casing. The lid assembly includes a lid body adapted to protrude into the cartridge casing so as to occupy a space between the recording medium within the cartridge casing and the access opening. The lid body includes a regulating surface for restricting a play of the recording medium within the cartridge casing and left and right cutouts defined therein in a manner alignable with the left and right recesses, respectively. A thin-walled cavity for reducing the volume and weight of the lid assembly being formed so as to occupy a major portion of surface walls of the lid body while opening at at least one of upper and lower surface walls.

More specifically, the lid assembly comprises a first lid including the lid body and having one of the left and right cutouts and a second lid including the lid body and having the other of the left and right cutouts. A lock mechanism is employed in the vicinity of neighboring ends of the first and second lids for engagement to retain the first and second lids in a closed position.

In a preferred embodiment of the present invention, the first lid includes the lid body for closing a major portal area of the access opening and is supported by the cartridge casing for pivotal movement about a first pivot pin disposed frontwardly of one of the cutouts, and the second lid is supported by the cartridge casing for pivotal movement about a second pivot pin, disposed frontwardly of the other of the cutouts, in a direction substantially opposite to the first lid. In this embodiment, the lock mechanism includes a lock pawl formed in a rear end of the second lid so as to protrude outwardly therefrom and a lock recess defined in an inner surface of a free end of the first lid remote from the first pivot pin.

In an alternative embodiment of the present invention, the first lid includes the lid body for closing a major portal area of the access opening and is supported by the cartridge casing for sliding along the major portal area of the access opening, wherein the second lid is supported by the cartridge casing for pivotal movement about a pivot pin, disposed frontwardly of the adjacent cutout. In this embodiment, the lock mechanism includes a first engagement defined in one end of the first lid adjacent the second lid and a second engagement defined in a rear end of the second lid.

According to the present invention, the generally U-shaped access opening is defined in the cartridge casing so as to occupy the rear surface of the cartridge casing and the rear portions of the left and right sides of the cartridge casing including the left and right positioning recesses. Since this access opening is adapted to be closed by the lid assembly occupying a part of the contour of the cartridge casing, selective insertion and removal of the recording medium into and from the cartridge casing can easily be accomplished simply by opening the lid assembly. In addition, respective portions of the walls confronting the left and right recesses are opened, the cartridge casing need not have an increased size.

With the lid assembly held in the closed position, the lid assembly closes the access opening to thereby avoid any possible ingress of foreign matter into the cartridge casing. The provision of the thin-walled cavity in the lid body which occupies a substantial portion of the lid assembly is effective to reduce the volume and weight of the lid assembly in a quantity corresponding to those of the thin-walled cavity. Any possible deformation during molding can also be avoided.

In the disc cartridge of the structure wherein the lid assembly 7 is made up of the first and second lids and the access opening can be opened by opening the first and second lids, the stroke of movement of each of the first and second lids can be reduced as compared with that in the prior art disc cartridge, to thereby facilitate an easy insertion and removal of the recording medium into and from the disc cartridge.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
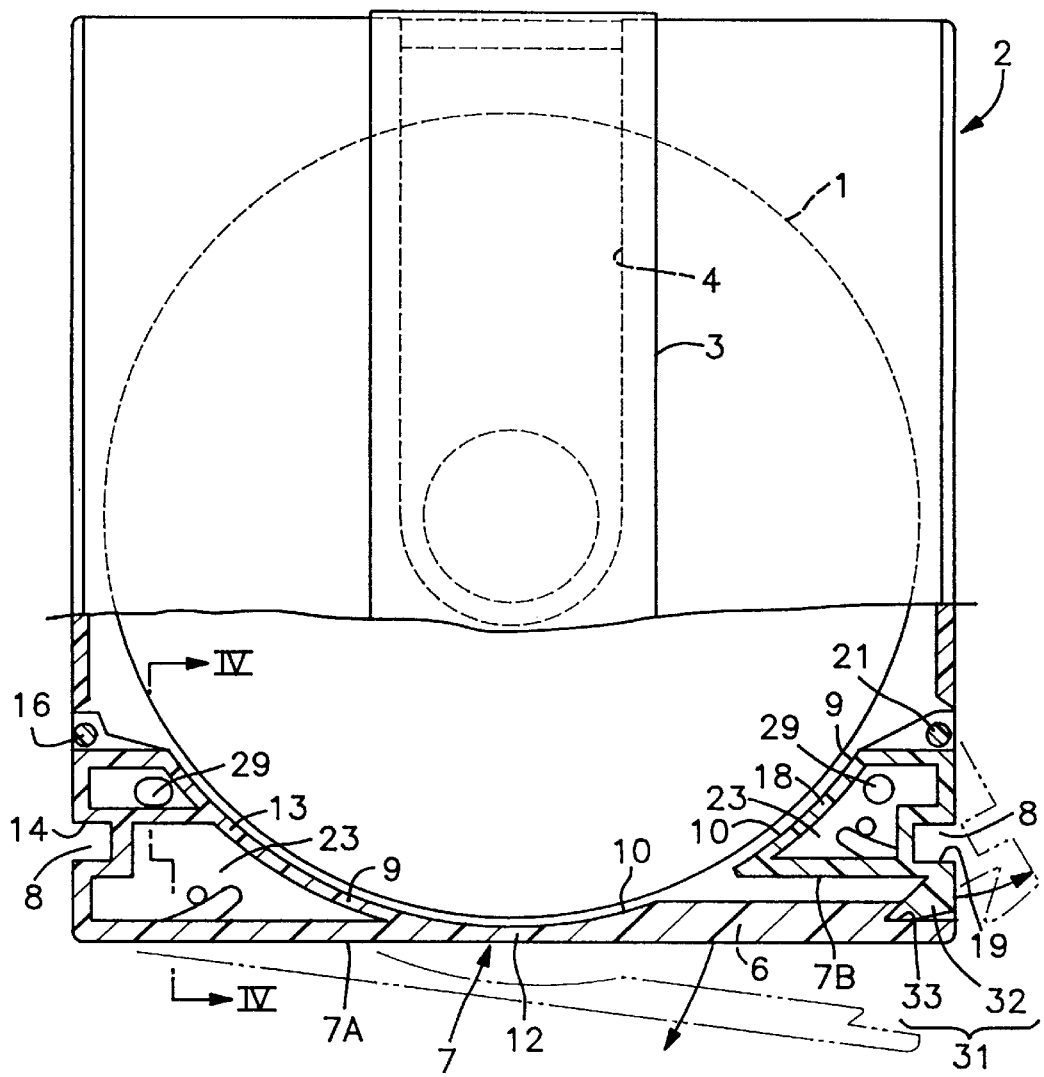
FIG. 1 is a schematic top plan view, with a portion cut away, of a disc cartridge according to a first preferred embodiment of the present invention.
Figure 4:
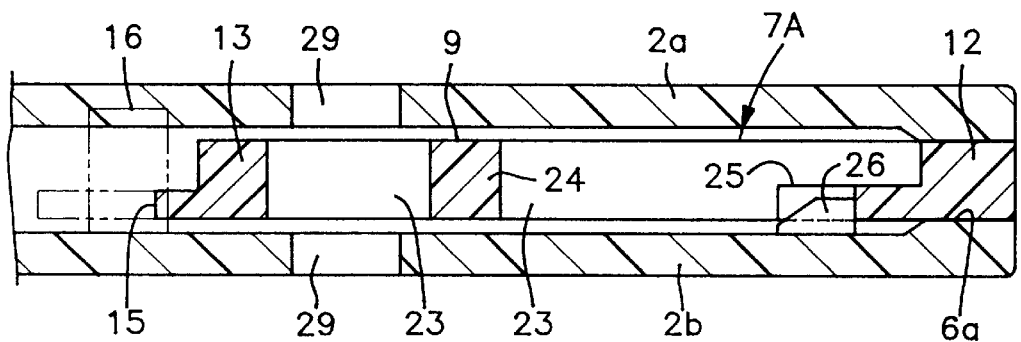
FIG. 4 is a fragmentary cross-sectional view taken along the line A—A in FIG. 1.

Referring first to FIGS. 1 to 5, a disc-shaped optical or magnetooptical recording medium is shown in the form of, for example, an optical disc 1 having first and second major surfaces opposite to each other with audio and/or video signals recorded on each major surface thereof. This optical disc 1 is freely rotatably accommodated within a disc cartridge made of a moldable plastic material and including a generally rectangular flattened cartridge casing 2.

The cartridge casing 2 is made up of top and bottom panels 2a and 2b joined together by means of left and right side walls and a front side wall, with an access opening 6 defined in opposition to the front side wall for selective removal or insertion of the optical disc 1 from or into the interior of the cartridge casing. The disc cartridge has generally rectangular access windows 4 defined respectively in the top and bottom panels 2a and 2b at a location intermediate of the width of the disc cartridge for the access of read/write heads (not shown) to the associated major surfaces of the optical disc 1. The access windows 4 are normally closed by a slide shutter 3 that is locked at a closed position by a suitable lock mechanism (not shown) when the disc cartridge is not loaded in an information recording and/or reproducing machine.

Figure 2:
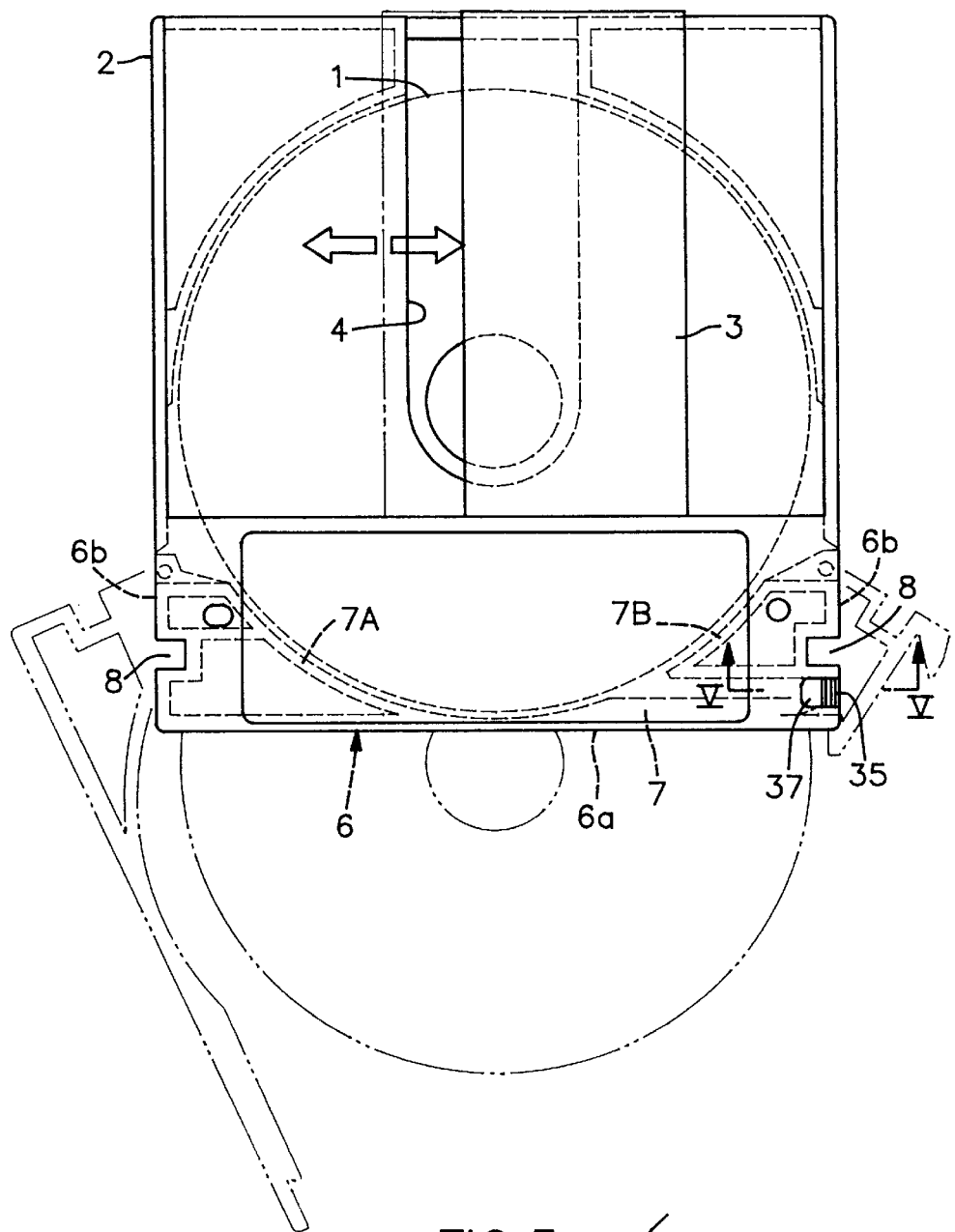
FIG. 2 is a schematic top plan view of the disc cartridge shown in FIG. 1

The access opening 6 is adapted to be selectively opened and closed by a cover assembly 7 that is pivotally supported by the cartridge casing 2. Left and right positioning recesses 8 are provided on respective sides of the cartridge casing 1 adjacent the rear end thereof. In this layout, the access opening 6 is made up of a major portal area 6a of a size sufficient to occupy an entire width of the rear end of the cartridge casing 1 and left and right side portal areas 6b open at respective rear ends of left and right side walls of the cartridge casing 2 which encompass the associated positioning recesses 8. Thus, the access opening 6, when viewed from above as shown in FIGS. 1 and 2, represents a generally U-shaped configuration extending from a rear end of one side wall of the cartridge casing 2 to a rear end of the opposite side wall of the cartridge casing 2 after having traversed the rear end of the cartridge casing 2.

The cover assembly 7 is of a two-piece design including a first lid 7A and a second lid 7B. As shown in FIG. 1, each lid 7A and 7B is provided with a lid body 9 protruding into the cartridge casing 2 so as to occupy a space between the optical disc 1 and the access opening. The lid body 9 of each of the first and second lids 7A and 7B is formed with a partially arcuate regulating surface 10 for restricting an arbitrary motion or play of the optical disc 1 within the cartridge casing 2.

Figure 3:
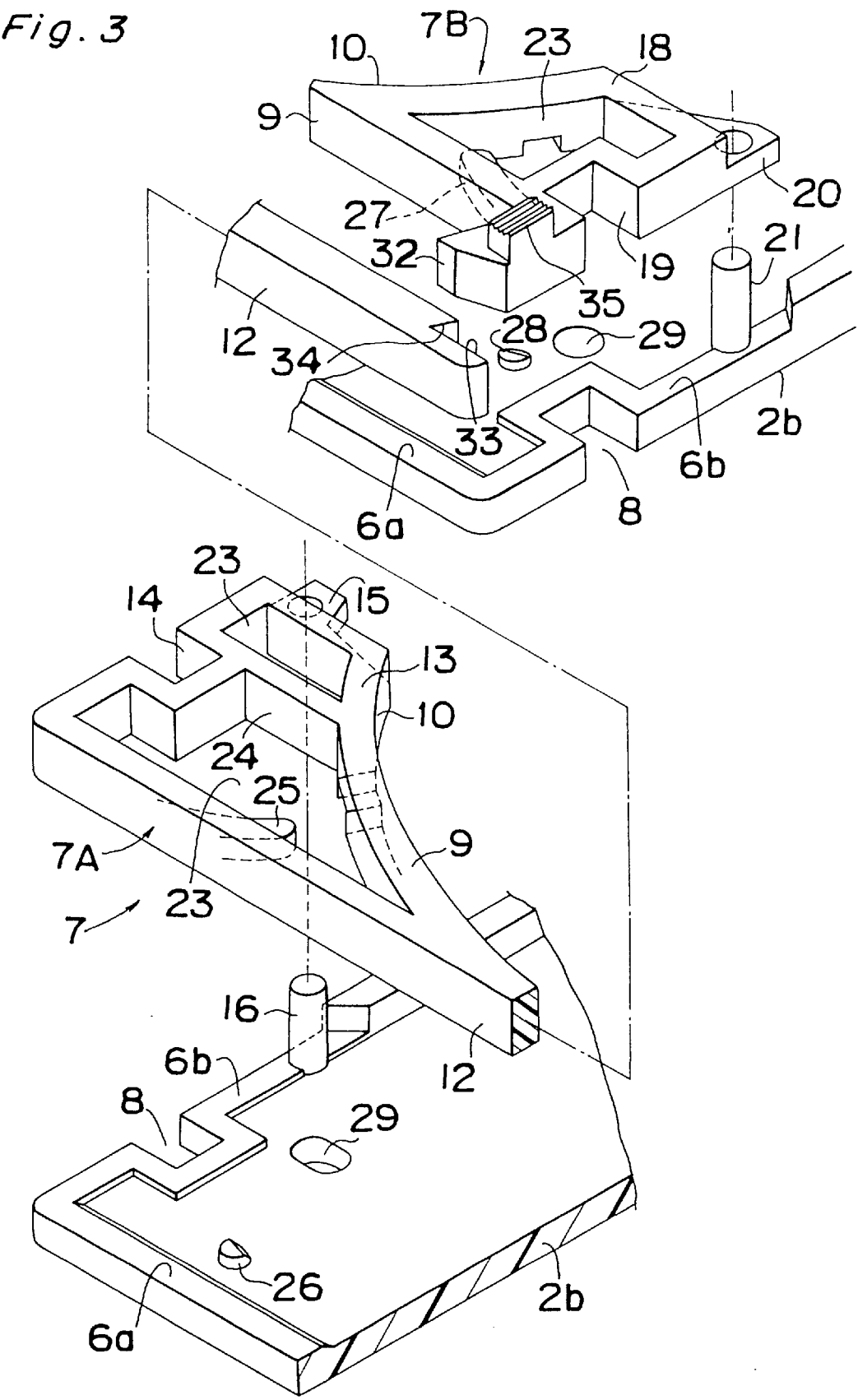
FIG. 3 is an exploded view of opposite rear corners of the disc cartridge, showing the details of a cover assembly employed in the disc cartridge of the present invention.

The lid body 9 of the first lid 7A includes a rear wall 12 for closing the major portal area 6a of the access opening 6 and a generally trapezoidal corner wall 13 for filling up a rear left corner region of the cartridge casing 2 and has a generally U-shaped cutout 14, similar in shape to the left positioning recess 8, defined in a side wall segment of the corner wall 13 in alignment with the associated positioning recess 8. As best shown in FIG. 3, the corner wall 13 has a front wall segment formed with a bearing lug 15 through which a pivot pin 16 integral with an inner surface of the bottom panel 2b extends so as to allow the first lid 7A to pivot thereabout between opened and closed positions spaced from each other an angle of 90° or more about the pivot pin 16. Accordingly, the first lid 7A is, when in the closed position as shown by the solid line in FIG. 1, held in position to close the major portal area 6a and the left side portal area 6b simultaneously, but is, when in the opened position substantially as shown by the double-dotted phantom line in FIG. 2, held in position to open the major portal area 6a and the left side portal area 6b simultaneously. It is to be noted that the position where the pivot pin 16 is formed on the bottom panel 2b of the cartridge casing 2 is preferably chosen as to be as close to the left side of the cartridge casing 2 as possible.

The lid body 9 of the second lid 7B includes a generally trapezoidal corner wall 18 for filling up a rear right corner region of the cartridge casing 2 and has a generally U-shaped cutout 19, similar in shape to the right positioning recess 8, defined in a side wall segment of the corner wall 18 in alignment with the associated positioning recess 8. As best shown in FIG. 3, the corner wall 18 has a front wall segment formed with a bearing lug 20 through which a pivot pin 21 integral with the inner surface of the bottom panel 2b extends so as to allow the second lid 7B to pivot thereabout between opened and closed positions spaced from each other an angle of 90° or more about the pivot pins 21. Accordingly, the second lid 7B is, when in the closed position as shown by the solid line in FIG. 1, held in position to close the right side portal area 6b, but is, when in the opened position as shown by the double-dotted phantom line in FIG. 2, held in position to open the right portal area 6b. As is the case with the pivot pin 16, the pivot pin 21 is preferably positioned as close to the right side of the cartridge casing 2 as possible.

In order to reduce the volume and weight of the cover assembly 7, a thin-walled cavity 23 is defined in each of the first and second lids 7A and 7B to thereby render the respective corner wall 13 or 18 to represent a generally frame structure. As best shown in FIG. 3, the thin-walled cavity 23 defined in the first lid 7A extends completely across the first lid 7A in a direction substantially perpendicular to any of the top and bottom panels 2a and 2b while occupying a major portion of the corner wall 13 and is traversed by a reinforcement rib 24 formed in the corner wall 13 so as to divide the thin-walled cavity 23 into two segments. A front lower surface region of the rear wall 12 which confronts the thin-walled cavity 23 is formed with a generally arcuate drawing pawl 25 which is engageable with a guide pin 26 integral with the bottom panel 2b, when the first lid 7A is pivoted towards the closed position, to guide the first lid 7A as a whole inwardly into the access opening 6 (See FIG. 4).

As is the case with the thin-walled cavity 23 in the first lid 7A, the thin-walled cavity 23 defined in the second lid 7B extends completely across the second lid 7B in a direction substantially perpendicular to any of the top and bottom panels 2a and 2b while occupying a major portion of the corner wall 18. A front lower surface region of a rear wall of the corner wall 18 which confronts the thin-walled cavity 23 is formed with a generally arcuate drawing pawl 27 which is engageable with a guide pin 28 integral with the bottom panel 2b, when the second lid 7B is pivoted towards the closed position, to guide the second lid 7B as a whole inwardly into the right portal area 6b.

Respective portions of the top and bottom panels 2a and 2b which are aligned with the thin-walled cavities 23 in the first and second lids 7A and 7B then held in the closed position are formed with positioning holes 29 through which associated positioning pins installed on a player or disc drive are engaged when the disc cartridge is loaded in the player or disc drive. Thus, the thin-walled cavities 23 defined in the first and second lids 7A and 7B can be advantageously utilized to accommodate the positioning pins then extending through the positioning holes 29 as shown in FIG. 1.

Figure 5:
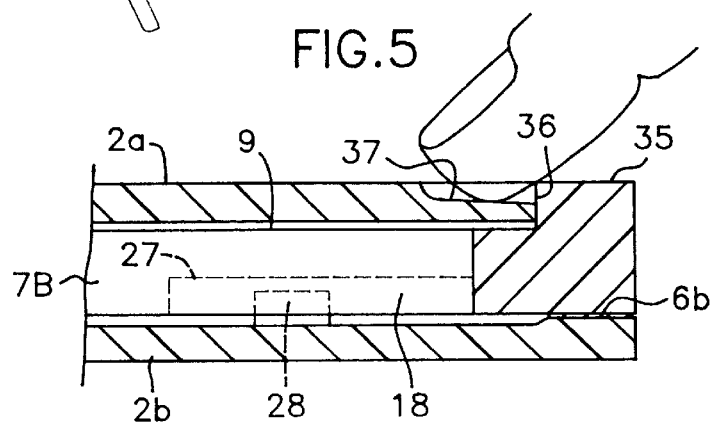
FIG. 5 is a fragmentary cross-sectional view taken along the line B—B in FIG. 2.

To keep the first and second lids 7A and 7B closed when they are moved to their closed position, a lock mechanism 31 is employed and disposed between the first and second lids 7A and 7B. Referring particularly to FIG. 3, the lock mechanism 31 includes a generally wedge-shaped lock pawl 32 formed in the second lid 7B at a location on one side opposite to the U-shaped cutout 19 so as to protrude outwardly therefrom, and a lock recess 33 defined in an inner surface of a free end of the first lid 7A remote from the bearing lug 15, that is, an inner surface of a right end of the rear wall 12 of the first lid 7A. The lock pawl 32 is engageable with an inclined step 34 defined deep in the lock recess 33 to thereby prevent the first lid 7A from being freely pivoted towards the opened position about the pivot pin 16. To enable the second lid 7B to be opened, the lock pawl 32 has an upper surface formed with a knob 35 protruding outwardly through an aperture 36, defined in the top panel 2a, so as to terminate in flush with an outer surface of the top panel 2a as shown in FIG. 5. A portion of the outer surface of the top panel 2a adjacent the aperture 36 is formed with a shallow, finger-engaging groove 37 to accommodate a finger that is placed on the knob 35 when the first and second lids 7A and 7B are desired to be opened.

In the construction described hereinabove, when the optical disc 1 within the disc cartridge is desired to be removed therefrom, the knob 35 has to be pulled outwardly against an engaging force of the lock pawl 32 to thereby allow the second and first lids 7B and 7A to successively swing to open the access opening 6. On a condition in which the first and second lids 7A and 7B are pivoted about 90° to the opened position, most of the corner walls 13 and 18 of the first and second lids 7A and 7B reside laterally outwardly from the left and right portal areas 6b, respectively, so that when the disc cartridge is subsequently tilted with the access opening 6 oriented slantwise downwardly, the optical disc within the cartridge casing 2 can slide until an outer peripheral portion of the optical disc 1 appears outwardly of the access opening 6 to thereby facilitate subsequent complete removal of the optical disc 1 out of the disc cartridge.

The first and second lids 7A and 7B so opened can be closed by following a process substantially reverse to that described above, with the first and second lids 7A and 7B consequently brought to the closed position to thereby avoid any possible ingress of foreign matter into the disc cartridge through the positioning recesses 8.

While in the foregoing embodiment of the present invention the cover assembly 7 has been shown and described as made up of the pivotally supported first and second lids 7A and 7B, the cover assembly employed in a second embodiment shown in FIGS. 6A, 6B and 7 makes use of a slidable lid and a pivotable lid which will now be described in detail.

Figure 6A:
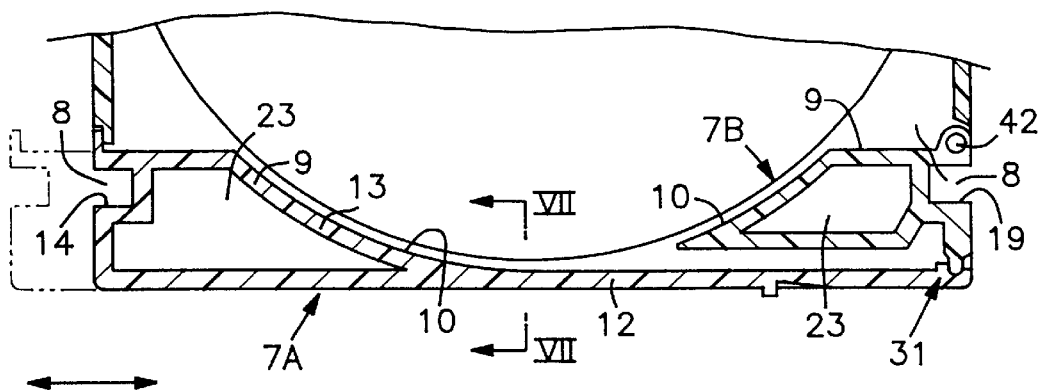
FIG. 6A is a schematic sectional view of a rear end portion of the disc cartridge according to a second preferred embodiment of the present invention.
Figure 6B:
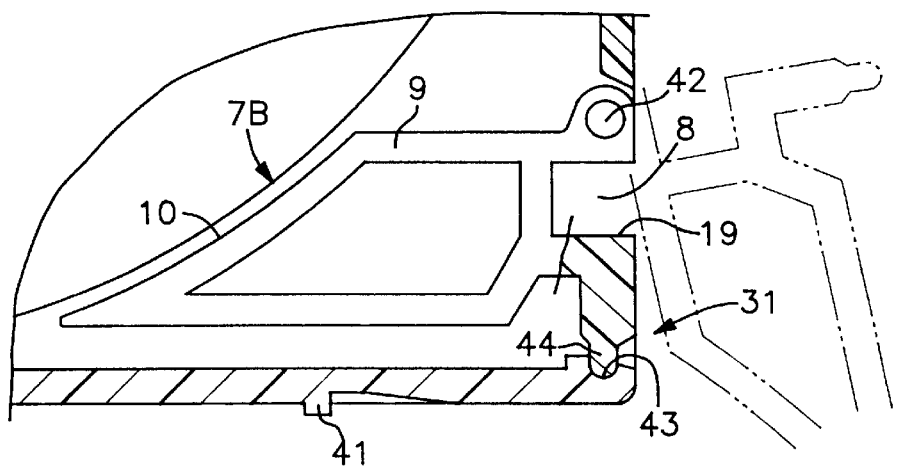
FIG. 6B is a schematic sectional view, on an enlarged scale, of a rear right corner of the disc cartridge shown in FIG. 6A.
Figure 7:
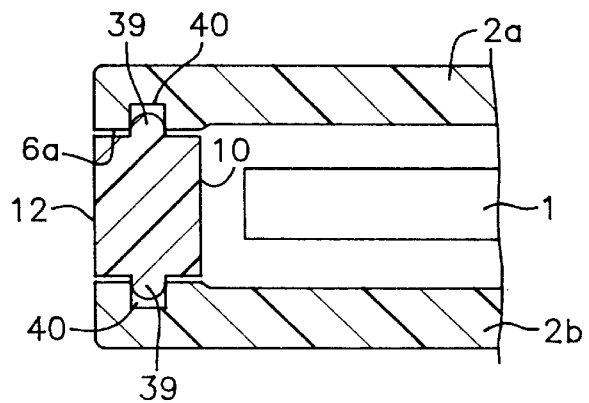
FIG. 7 is a schematic cross-sectional view taken along the line C—C in FIG. 6A.

As best shown in FIG. 6A, the first or slide lid 7A is supported by the cartridge casing 2 for sliding movement between opened and closed positions in a direction along the plane of the access opening 6, that is, in a direction lengthwise thereof. More specifically, as best shown in FIG. 7, the rear wall 12 of the lid body 9 of the slide lid 7A has top and bottom longitudinal surfaces formed with respective guide ribs 39 protruding outwardly Therefrom. This slide lid 7A is supported by the cartridge casing 2 with the guide ribs 39 slidingly received in associated guide grooves 40 that are defined in the inner surfaces of the top and bottom panels 2a and 2b. A slide operating knob 41 accessible to the finger of the user is formed on a portion of the rear surface of the rear wall 12 adjacent the second or pivotable lid 7B. On the other hand, the pivotable lid 7B is supported for pivotal movement between the opened and closed position about a pivot pin 42 extending between the top and bottom panels 2a and 2b at a location adjacent a front portion of the right positioning recess 19.

The lock mechanism 31 employed in the second embodiment includes a first engagement 43 in the form of an engagement recess defined in an inner surface of a right end of the rear wall 12 and a second engagement 44 in the form of an engagement projection engageable with the first engagement 43 and formed in a rear end of a corner wall 41 that is positioned rearwardly of the positioning recess 19. This lock mechanism 31 is so shaped and so configured that when and so long as the slide and pivotable lids 7A and 7B are held in the closed position as shown in FIG. 6A, the first and second engagements 43 and 44 can be engaged with each other, but when the slide lid 7A is forcibly moved in a leftward direction, as viewed in FIGS. 6A and 6B towards the opened position, the first and second engagements 43 and 44 can be disengaged from each other to open the major portal area 6a and the left side portal area 6b. As a matter of design, the slide lid 7A can be closed when the latter is moved in a rightward direction as viewed in FIGS. 6A and 6B and, on the other hand, when the pivotable lid 7B is pushed towards the major portal area 6a, the second engagement 44 integral with the pivotable lid 7B can be engaged with the first engagement 43 integral with the slide lid 7A to lock the slide and pivotable lids 7A and 7B in the closed position.

In any one of the foregoing embodiments of the present invention, the lid assembly 7 has been of the two-piece design including the first and second lids 7A and 7B. However, in a third preferred embodiment of the present invention will now be described with particular reference to FIG. 8, a single lid is employed for the lid assembly 7.

Figure 8:
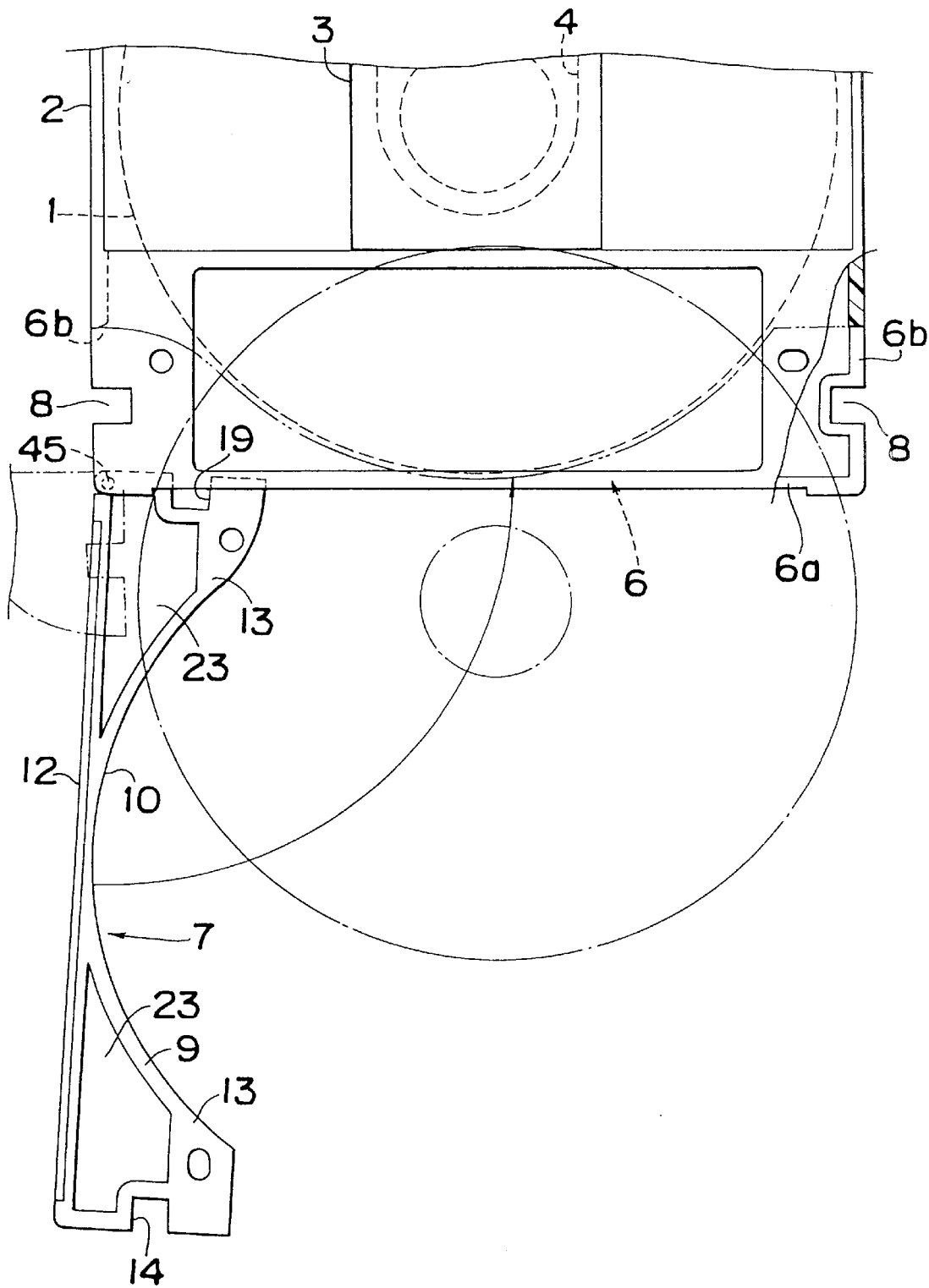
FIG. 8 is a schematic view, generally similar to FIG. 2, showing the disc cartridge according to a third preferred embodiment of the present invention.

Referring now to FIG. 8, The lid 7 comprises the lid body 9 including the rear wall 12 for closing the major portal area 6a and the left and right corner walls 13 formed integrally with left and right ends of the rear wall 12 so as to protrude towards the cartridge casing 2. The lid body 9 is supported for pivotal movement between opened and closed positions about a pivot pin 45 journalled to rear left and right corners of the cartridge casing 2. The left and right corner walls 13 are formed with respective cutouts 19, 14 which are, when and so long as the lid body 9 is in the closed position, aligned with and in communication with the positioning recesses 8, respectively. In addition, by the reason similar to that discussed in connection with the first preferred embodiment of the present invention, thin-walled cavities 23 are defined in the left and right corner walls 13.

Even the lid assembly employed in the embodiment shown in FIG. 8 functions in a manner substantially similar to that employed in the first embodiment of the present invention. Specifically, when the lid body 9 is pivoted from the closed position approximately 180° about the pivot pin 45, the access opening 6 can be opened.

Other than those discussed above, each thin-walled cavity 23 although shown as extending completely across the associated lid in a direction substantially perpendicular to any of the top and bottom panels, may have a bottom defined by either the top panel or the bottom panel of the cartridge casing. Alternatively, it may be in the form of a confined chamber. Also, the first and second lids 7A and 7B may be divided generally at a center of the rear of the casing and may be retained in the closed position by means of the lock mechanism disposed between the first and second lids 7A and 7B. The first lid 7A may be formed including one of the top and bottom panels of the cartridge casing 2, in which case the first lid 7A may be supported for pivotal movement in a vertical direction relative to the cartridge casing 2. The bearing lugs 15 and 20 employed in the first embodiment of the present invention may be formed to have the same thickness as the corner walls 13 and 18.

Thus, according to the present invention, the generally U-shaped access opening 6 is defined in the cartridge casing 2 so as to occupy the rear surface of the cartridge casing 2 and the rear portions of the left and right sides of the cartridge casing 2 including the left and right positioning recesses 8, in combination with the use of the lid body 9 which protrudes into the cartridge casing 2 so that the access opening 6 can be assuredly closed by the lid assembly 7. Accordingly, by opening the lid assembly 7, the disc 1 an easily be removed from or inserted into the cartridge casing 2 with no need to render the cartridge casing 2 bulky in size and, moreover, any possible ingress of foreign matter into the cartridge casing 2 through the positioning recesses 8 can be avoided, when and so long as the lid assembly is closed, to thereby eliminate the problem associated with recording and/or reading errors which would otherwise occur as a result of adherence of foreign matter on the optical disc 1. In addition, the lid body 9 which occupies a major portion of the lid assembly 7 is formed with the thin-walled cavity 23, the volume and weight of the lid assembly 7 can be reduced considerably as compared with those of the conventional lid assembly, eliminating the possibility that the lid assembly may be deformed during molding thereof.

In the disc cartridge of the structure wherein the lid assembly 7 is made up of the first and second lids 7A and 7B and the access opening 6 can be opened by opening the first and second lids 7A and 7B, the stroke of movement of each of the first and second lids 7A and 7B can be reduced as compared with that in the prior art disc cartridge, to thereby facilitate an easy insertion and removal of the optical disc 1 into and from the disc cartridge. Since the lid assembly can be locked closed by means of the lock mechanism 31 disposed between the first and second lids 7A and 7B, the possibility that the lid assembly 7 is accidentally opened when, for example, the weight of the optical disc 1 acts on the first lid 7A during the handling of the disc cartridge can advantageously be avoided to thereby avoid the possibility that the optical disc 1 may be damaged when the disc cartridge is inadvertently fallen onto the ground.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A disc cartridge for freely rotatably accommodating a disc-shaped recording medium, which comprises:

a cartridge casing having a disc chamber defined therein for freely rotatably accommodating the recording medium and also having front and rear ends opposite to each other and left and right sides opposite to each other and top and bottom panels opposite to each other, said cartridge casing having left and right recesses defined in respective portions of the left and right sides of the cartridge casing adjacent the rear end thereof, said cartridge casing further having a generally U-shaped access opening defined in the rear end thereof and respective portions of the left and right sides thereof including the associated recesses; and a lid assembly pivotally supported by the cartridge casing for selectively opening and closing the access opening and including a lid body adapted to protrude into the cartridge casing so as to occupy a space between the recording medium within the cartridge casing and the access opening;

said lid body including a regulating surface for restricting a play of the recording medium within the cartridge casing and left and right cutouts defined therein in a manner alignable with the left and right recesses, respectively; and a thin-walled cavity for reducing the volume and weight of the lid assembly being formed so as to occupy a major portion of surface walls of the lid body while opening upwardly and downwardly at inner surface walls of the top and bottom panels, respectively, wherein the top and/or bottom panel is formed with at least one positioning hole which is aligned with the thin-walled cavity of the lid assembly when the lid assembly is in a closed position.

2. A disc cartridge for freely rotatable accommodating a disc-shaped recording medium, which comprises:

a cartridge casing having a disc chamber defined therein for freely rotatable accommodating the recording medium and also having front and rear ends opposite to each other and left and right sides opposite to each other, said cartridge casing having left and right recesses defined in respective portions of the left and right sides of the cartridge casing adjacent the rear end thereof, said cartridge casing further having a generally U-shaped access opening defined in the rear end thereof and respective portions of the left and right sides thereof including the associated recesses; and a lid assembly pivotally supported by the cartridge casing for selectively opening and closing the access opening and including a lid body adapted to protrude into the cartridge casing so as to occupy a space between the recording medium within the cartridge casing and the access opening;

said lid body including a regulating surface for restricting a play of the recording medium within the cartridge casing and left and right cutouts defined therein in a manner alienable with the left and right recesses, respectively;

a thin-walled cavity for reducing the volume and weight of the lid assembly being formed so as to occupy a major portion of surface walls of the lid body while opening at least one of upper and lower surface walls; and wherein the lid assembly comprises a first lid including the lid body and having one of the left and right cutouts and a second lid including the lid body and having the other of the left and right cutouts, and further comprising a lock mechanism provided in the vicinity of neighboring ends of the first and second lids for engagement to retain the first and second lids in a closed position.

3. The disc cartridge as claimed in claim 2, wherein the first lid includes the lid body for closing a major portal area of the access opening and is supported by the cartridge casing for pivotal movement about a first pivot pin disposed frontwardly of one of the cutouts, wherein the second lid is supported by the cartridge casing for pivotal movement about a second pivot pin, disposed frontwardly of the other of the cutouts, in a direction substantially opposite to the first lid, and wherein the lock mechanism includes a lock pawl formed in a rear end of the second lid so as to protrude outwardly therefrom and a lock recess defined in an inner surface of a free end of the first lid remote from the first pivot pin.

4. The disc cartridge as claimed in claim 2, wherein the first lid includes the lid body for closing a major portal area of the access opening and is supported by the cartridge casing for sliding along the major portal area of the access opening, wherein the second lid is supported by the cartridge casing for pivotal movement about a pivot pin, disposed frontwardly of the adjacent cutout, and wherein the lock mechanism includes a first engagement defined in one end of the first lid adjacent the second lid and a second engagement defined in a rear end of the second lid.

5. A disc cartridge for freely rotatably accommodating a disc-shaped recording medium, which comprises:

a cartridge casing having a disc chamber defined therein for freely rotatably accommodating the recording medium and also having front and rear ends opposite to each other and left and right sides opposite to each other and top and bottom panels opposite to each other, said cartridge casing having left and right recesses defined in respective portions of the left and right sides of the cartridge casing adjacent the rear end thereof, said cartridge casing further having a generally U-shaped access opening defined in the rear end thereof and respective portions of the left and right sides thereof including the associated recesses; and a lid assembly pivotally supported by the cartridge casing for selectively opening and closing the access opening and including a lid body adapted to protrude into the cartridge casing so as to occupy a space between the recording medium within the cartridge casing and the access opening;

said lid body including a regulating surface for restricting a play of the recording medium within the cartridge casing and left and right cutouts defined therein in a manner alignable with the left and right recesses, respectively;

a thin-walled cavity for reducing the volume and weight of the lid assembly being formed so as to occupy a major portion of surface walls of the lid body while opening upwardly and downwardly at inner surface walls of the top and bottom panels, respectively, wherein the top and/or bottom panel is formed with at least one positioning hole which is aligned with the thin-walled cavity of the lid assembly when the lid assembly is in a closed position; and said regulating surface of the lid body is generally arcuately curved inwardly of the lid body and the thin-walled cavity is defined so as to follow along the arcuately curved regulating surface.

6. The disc cartridge according to claim 5, wherein the thin-walled cavity has corner walls which are generally arcuately curved along the regulating surface of the lid body.

* * * * *